United States Patent
Bilenko et al.

(10) Patent No.: US 10,482,482 B2
(45) Date of Patent: Nov. 19, 2019

(54) PREDICTING BEHAVIOR USING FEATURES DERIVED FROM STATISTICAL INFORMATION

(71) Applicant: Microsoft Corporation, Redmond, WA (US)

(72) Inventors: Mikhail Bilenko, Bellevue, WA (US); Ran Gilad-Bachrach, Bellevue, WA (US); Christopher A. Meek, Kirkland, WA (US); Mikhail Royzner, Moscow (RU)

(73) Assignee: Microsoft Technology Licensing, LLC, Redmond, WA (US)

( * ) Notice: Subject to any disclaimer, the term of this patent is extended or adjusted under 35 U.S.C. 154(b) by 376 days.

(21) Appl. No.: 13/892,311

(22) Filed: May 13, 2013

(65) Prior Publication Data

US 2014/0337096 A1 Nov. 13, 2014

(51) Int. Cl.
*G06Q 30/00* (2012.01)
*G06Q 30/02* (2012.01)
(Continued)

(52) U.S. Cl.
CPC ......... *G06Q 30/0202* (2013.01); *G06N 20/00* (2019.01); *G06Q 10/067* (2013.01);
(Continued)

(58) Field of Classification Search
CPC ........... G06Q 30/0255; G06Q 30/0235; G06Q 10/105; G06Q 10/103; G06Q 10/067;
(Continued)

(56) References Cited

U.S. PATENT DOCUMENTS 6,078,918 A 6/2000 Allen et al.
7,631,008 B2 12/2009 Carson et al.
(Continued)

FOREIGN PATENT DOCUMENTS

CN 1598817 A 3/2005
CN 101221636 A 7/2008

OTHER PUBLICATIONS

Shekhar R. Gaddam, "K-Means+ID3: A Novel Method for Supervised Anomaly Detection by Cascading K-Means Clustering and ID3 Decision Tree Learning Methods", IEEE Transactions on Knowledge and Data Engineering, vol. 19, No. 3, Mar. 2007, pp. 345-354.*

(Continued)

*Primary Examiner* — Amber A Misiaszek
*Assistant Examiner* — Uche Byrd
(74) *Attorney, Agent, or Firm* — Shook, Hardy and Bacon, L.L.P.

(57) ABSTRACT

A training system is described herein for generating a prediction model that relies on a feature space with reduced dimensionality. The training system performs this task by producing partitions, each of which corresponds to a subset of aspect values (where each aspect value, in turn, may correspond to one or more attribute values). The training system then produces instances of statistical information associated with the partitions. Each instance of statistical information therefore corresponds to feature information that applies to a plurality of aspect values, rather than a single aspect value. The training system then trains the prediction model based on the feature information. Also described herein is a prediction module that uses the prediction model to make predictions in various online contexts.

20 Claims, 12 Drawing Sheets

(51) Int. Cl.
*G06N 20/00* (2019.01)
*G06Q 10/06* (2012.01)
*G06Q 10/10* (2012.01)
*G06Q 30/06* (2012.01)
*G06Q 40/00* (2012.01)

(52) U.S. Cl.
CPC ..... *G06Q 10/06315* (2013.01); *G06Q 10/103* (2013.01); *G06Q 10/105* (2013.01); *G06Q 30/00* (2013.01); *G06Q 30/02* (2013.01); *G06Q 30/0235* (2013.01); *G06Q 30/0255* (2013.01); *G06Q 30/06* (2013.01); *G06Q 40/00* (2013.01)

(58) Field of Classification Search
CPC .. G06Q 30/02; G06Q 10/06315; G06Q 40/00; G06Q 30/00; G06Q 7/20; G06Q 30/06; G06N 99/005
USPC .............................................. 705/7.11–7.42
See application file for complete search history.

(56) References Cited

U.S. PATENT DOCUMENTS

| | | | |
|---|---|---|---|
| 7,680,746 | B2 | 3/2010 | Agarwal |
| 7,827,170 | B1 | 11/2010 | Horling et al. |
| 8,019,704 | B1 | 9/2011 | Tong et al. |
| 8,108,406 | B2 | 1/2012 | Kenedy et al. |
| 8,170,960 | B1 | 5/2012 | Bill |
| 8,200,661 | B1 | 6/2012 | Pearce et al. |
| 8,655,695 | B1* | 2/2014 | Qu .................. G06Q 30/0251 705/14.49 |
| 2003/0004781 | A1 | 1/2003 | Mallon et al. |
| 2003/0149938 | A1* | 8/2003 | McElfresh ............ G06Q 30/02 715/251 |
| 2005/0114028 | A1 | 5/2005 | Wada |
| 2006/0129606 | A1 | 6/2006 | Horvitz et al. |
| 2007/0073579 | A1 | 3/2007 | Immorlica et al. |
| 2008/0162081 | A1 | 7/2008 | Sato |
| 2009/0006363 | A1* | 1/2009 | Canny .................. G06Q 30/02 |
| 2009/0132334 | A1 | 5/2009 | Wang et al. |
| 2010/0082421 | A1 | 4/2010 | Tuladhar et al. |
| 2010/0250335 | A1 | 9/2010 | Cetin et al. |
| 2010/0306161 | A1 | 12/2010 | Chen et al. |
| 2012/0131034 | A1* | 5/2012 | Kenedy ............ G06F 17/30867 707/767 |
| 2012/0158624 | A1 | 6/2012 | Lingenfelder et al. |
| 2012/0323677 | A1 | 12/2012 | Bottou et al. |
| 2013/0018830 | A1 | 1/2013 | Dhurandhar |
| 2013/0226781 | A1* | 8/2013 | Haggerty ............... G06Q 40/02 705/38 |

OTHER PUBLICATIONS

Chou, Philip A., "Optimal Partitioning for Classification and Regression Tree", In IEEE Transactions on Pattern Analysis and Machine Intelligence, vol. 13, Issue 4, Apr. 1991, pp. 340-354.

Yazdi, et al., "Multi Branch Decision Tree: A New Splitting Criterion", In International Journal of Advanced Science and Technology, vol. 45, Aug. 2012, pp. 91-105.

Dhillon, et al., "A Divisive Information-Theoretic Feature Clustering Algorithm for Text Classification", In Journal of Machine Learning Research, Mar. 2003, pp. 1265-1287.

Gaddam, et al., "K-Means+ID3: A Novel Method for Supervised Anomaly Detection by Cascading K-Means Clustering and ID3 Decision Tree Learning Methods", In IEEE Transactions on Knowledge and Data Engineering, vol. 19, Issue 3, Mar. 2007, pp. 345-354.

Loh, Wei-Yin, "Classification and Regression Trees", In Wiley Interdisciplinary Reviews: Data Mining and Knowledge Discovery, vol. 1, Issue 1, Feb. 2011, pp. 14-23.

"International Search Report and Written Opinion Received for PCT Patent Application No. PCT/US2014/037750", dated Feb. 4, 2015, 15 Pages.

Wang, et al., "Learning to Predict the Cost-Per-Click for Your Ad Words," retrieved at <<http://nlg.csie.ntu.edu.tw/~cjwang/paper/Learning%20to%20Predict%20the%20Cost-Per-Click%20for%20Your%20Ad%20Words.pdf>>, Proceedings of the 21st ACM International Conference on Information and Knowledge Management, Oct. 29, 2012, pp. 2291-2294.

Hillard, et al., "Improving Ad Relevance in Sponsored Search," retrieved at <<http://acm.org>>, Proceedings of the Third ACM International Conference on Web Search and Data Mining, 2010, pp. 361-369.

Piwowarski, et al. "Predictive User Click Models Based on Clickthrough History", retrieved at <<http://acm.org>>, Proceedings of the Sixteenth ACM Conference on Information and Knowledge Management, 2007, pp. 175-182.

"International Preliminary Report on Patentability Issued in PCT Application No. PCT/US2014/037750", dated Sep. 25, 2015, 7 Pages.

"Second Written Opinion Issued in PCT Application No. PCT/US2014/037750", dated Jul. 31, 2015, 6 Pages.

"Office Action and Search Report Issued in Chinese Patent Application No. 201480027818.0", dated Apr. 1, 2017, 10 Pages.

"Office Action Issued in European Patent Application No. 14730685.6", dated Nov. 6, 2018, 6 Pages.

* cited by examiner

PARTITION CHOICE SATISFIES ONE OR MORE OBJECTIVES, SUCH AS MINIMIZING LOSS OF PREDICTIVE ACCURACY

PREDICTING BEHAVIOR USING FEATURES DERIVED FROM STATISTICAL INFORMATION

BACKGROUND

An online system may employ a prediction model for various uses, such as to determine the likelihood that a user will click on an ad, or select an item within search results, etc. The online system can then take various actions based on its predictions, such as by serving one or more ads having high click probability, or by displaying items having high click probability in prominent positions within search results.

In one case, the prediction model may produce a prediction by identifying a collection of features which describe an event (where an "event" generally corresponds to the circumstance in which a prediction is being made). Those features collectively form a feature vector. The prediction module then maps the feature vector into a prediction. Some features correspond to individual attribute values (such different user IDs, different ad IDs, etc.), while other features correspond to combinations of attribute values (such as different combinations of user IDs and ad IDs). The feature vector in this case includes a feature for each individual attribute value and each combination of attribute values; however, the feature vector will be sparsely populated for any given event, meaning that it will include only a small number of non-zero features when it is used to describe any particular event. As can be appreciated, the feature space associated with the above-described type of prediction model may have very high dimensionality. Among other problems, it is difficult to train this kind of prediction model in an efficient manner, particularly in those cases in which the prediction model is complex (e.g., non-linear) in nature.

SUMMARY

A training system is described herein for generating a prediction model that relies on a reduced-dimensionality feature space. In some implementations, the training system operates by producing plural partitions based on a partitioning strategy. The partitions are associated with respective subsets of aspect values. The training system then identifies plural subsets of data within a master dataset that pertain to the respective plural partitions, and generates plural instances of statistical information for the respective subsets of data. The plural instances of statistical information correspond to feature information that reflects the distribution of labels in the subsets of data. The functionality then generates the prediction model based on the feature information.

In other words, the training system treats the instances of statistical information as features for use in training the model. Each instance of statistical information may correspond to a subset of plural aspect values (such as a plural user IDs), rather than a single aspect value (such as a single user ID). This strategy can greatly reduce the dimensionality of the feature space, compared to the case in which separate features are allocated to individual aspect values.

According to another illustrative aspect, the training system can group aspect values in a manner that that results in a minimum loss of predictive accuracy.

According to another illustrative aspect, a prediction module can use the prediction model produced using the training system to make predictions.

According to one potential benefit, the training system can produce a prediction model in an efficient manner, due principally to its mapping of a high-dimensional feature space into a lower-dimensional feature space. The training system can leverage this efficiency by producing sophisticated prediction models, which would not otherwise be feasible in the case of a prediction model that uses a high-dimensional frequency space.

The above approach can be manifested in various types of systems, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides a conceptual overview of an approach for producing and using a prediction model. Section B describes illustrative functionality for implementing the approach of Section A. Section C sets forth illustrative methods which explain the operation of the functionality of Section B. Section D describes illustrative computing functionality that can be used to implement any aspect of the features described in preceding sections.

Figure 13:
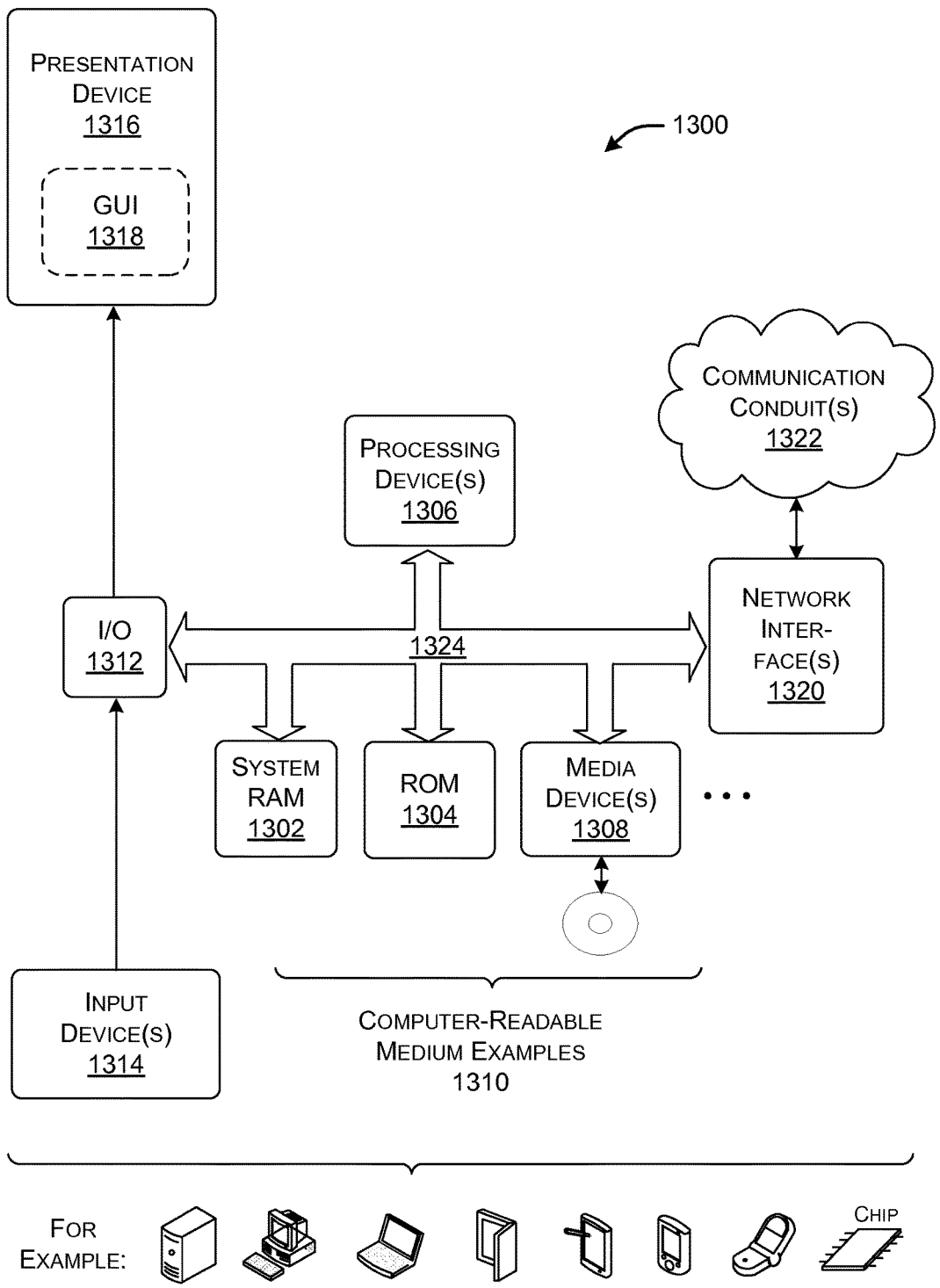
FIG. 13 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 13, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment a logic component represents an electrical component that is a physical part of the computing system, however implemented.

The phrase "means for" in the claims, if used, is intended to invoke the provisions of 35 U.S.C. § 112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Approach for Training and Using a Prediction Model

Figure 1:
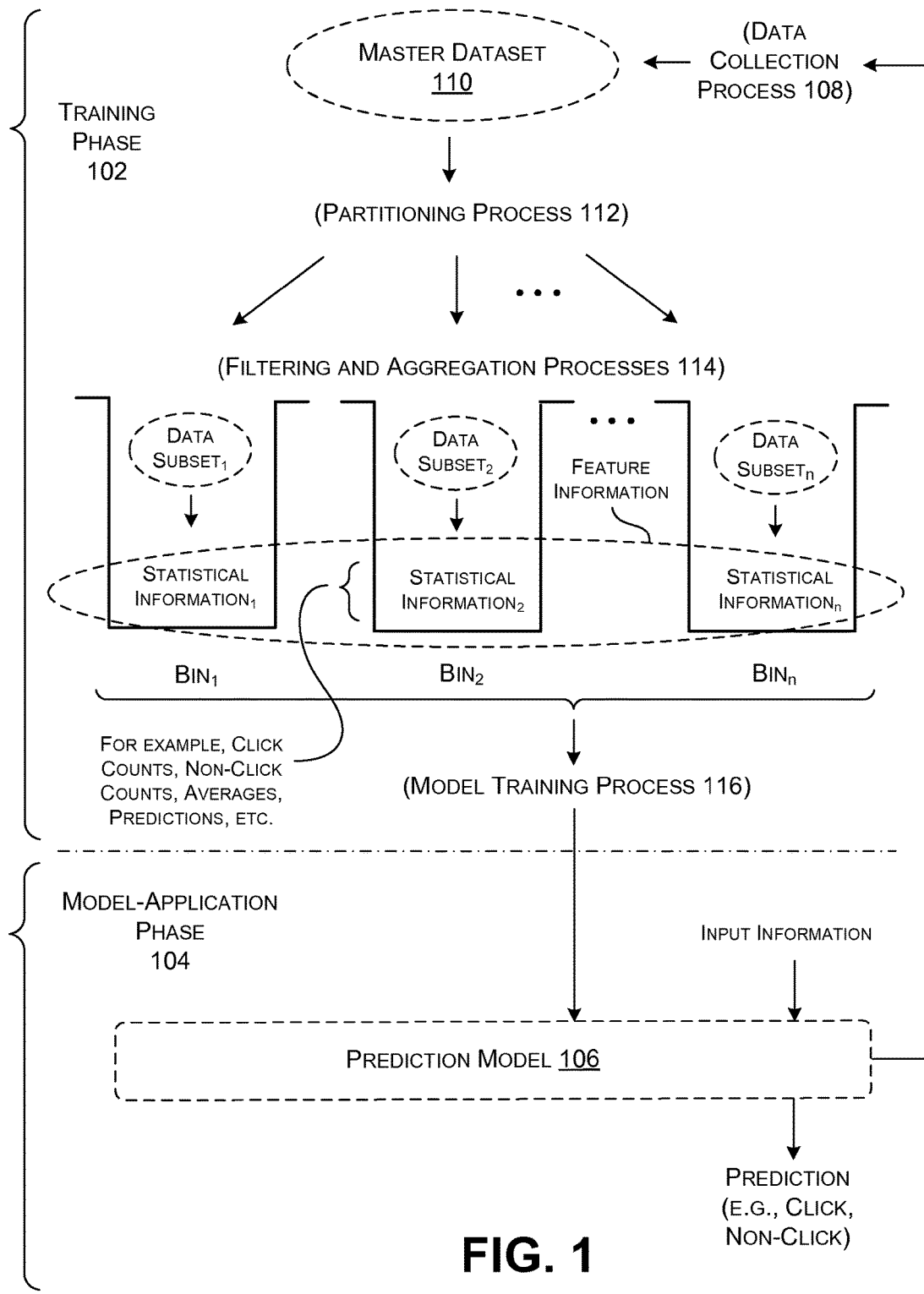
FIG. 1 shows an illustrative overview of an approach for producing and applying a prediction model, where that prediction model relies on a reduced-size frequency space.

FIG. 1 shows an illustrative approach that includes a training phase 102 and a model-application phase 104. In the training phase 102, a training system (not shown in FIG. 1) generates a prediction model 106. In the model-application phase 104, a prediction module (not shown in FIG. 1) uses the prediction model 106 to generate predictions. This section provides a conceptual overview of the training phase 102 and the model-application phase 104. Later sections provide additional details regarding these two components.

As to the training phase 102, a data collection process 108 produces a master dataset 110. The training system generates the prediction model 106 on the basis of data in the master dataset 110. Different environments may use different kinds of data collection processes to collect different respective kinds of data.

Figure 2:
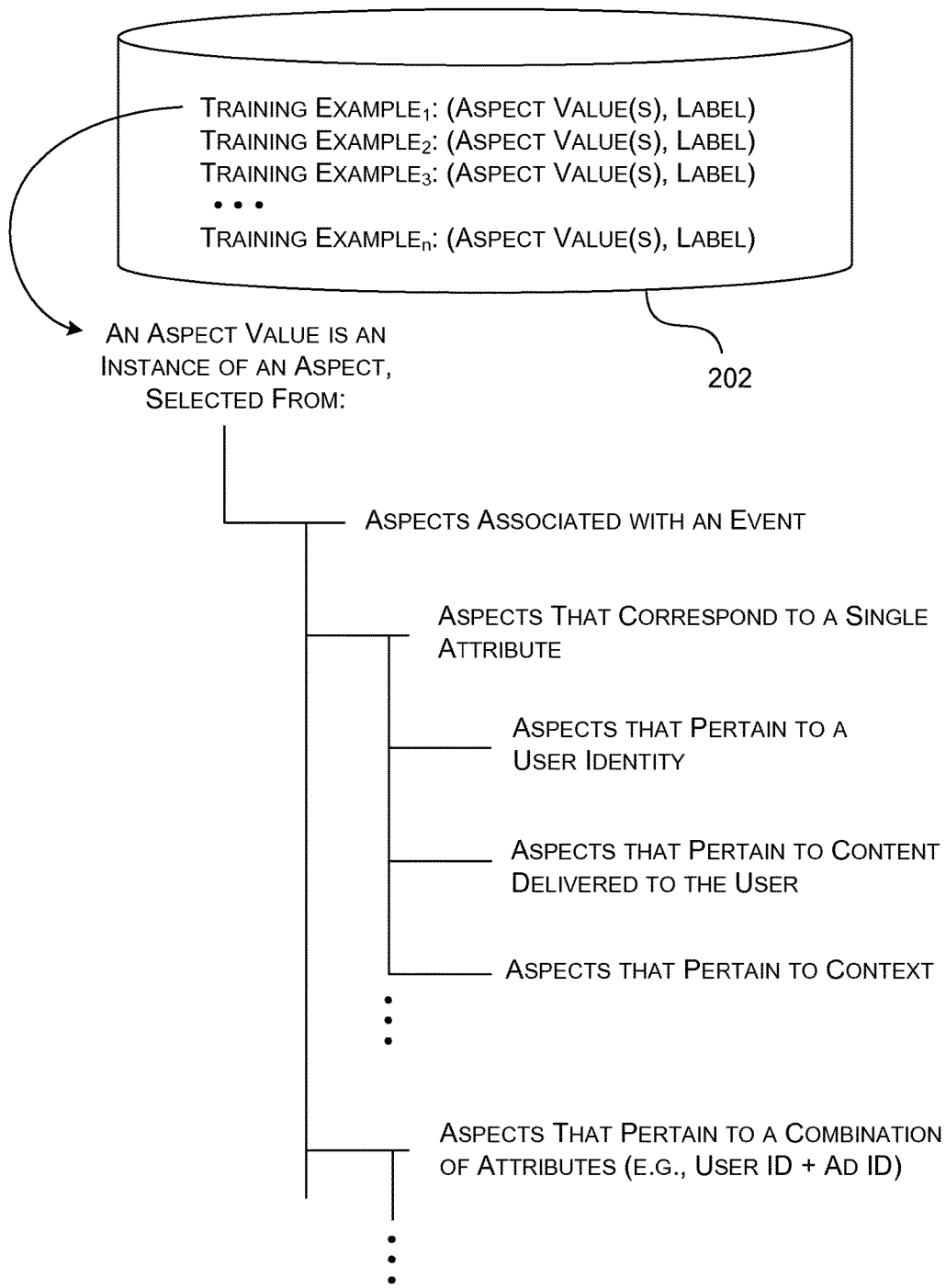
FIG. 2 shows an illustrative composition of a master dataset of training examples, used in a training process within the approach of FIG. 1.
Figure 3:
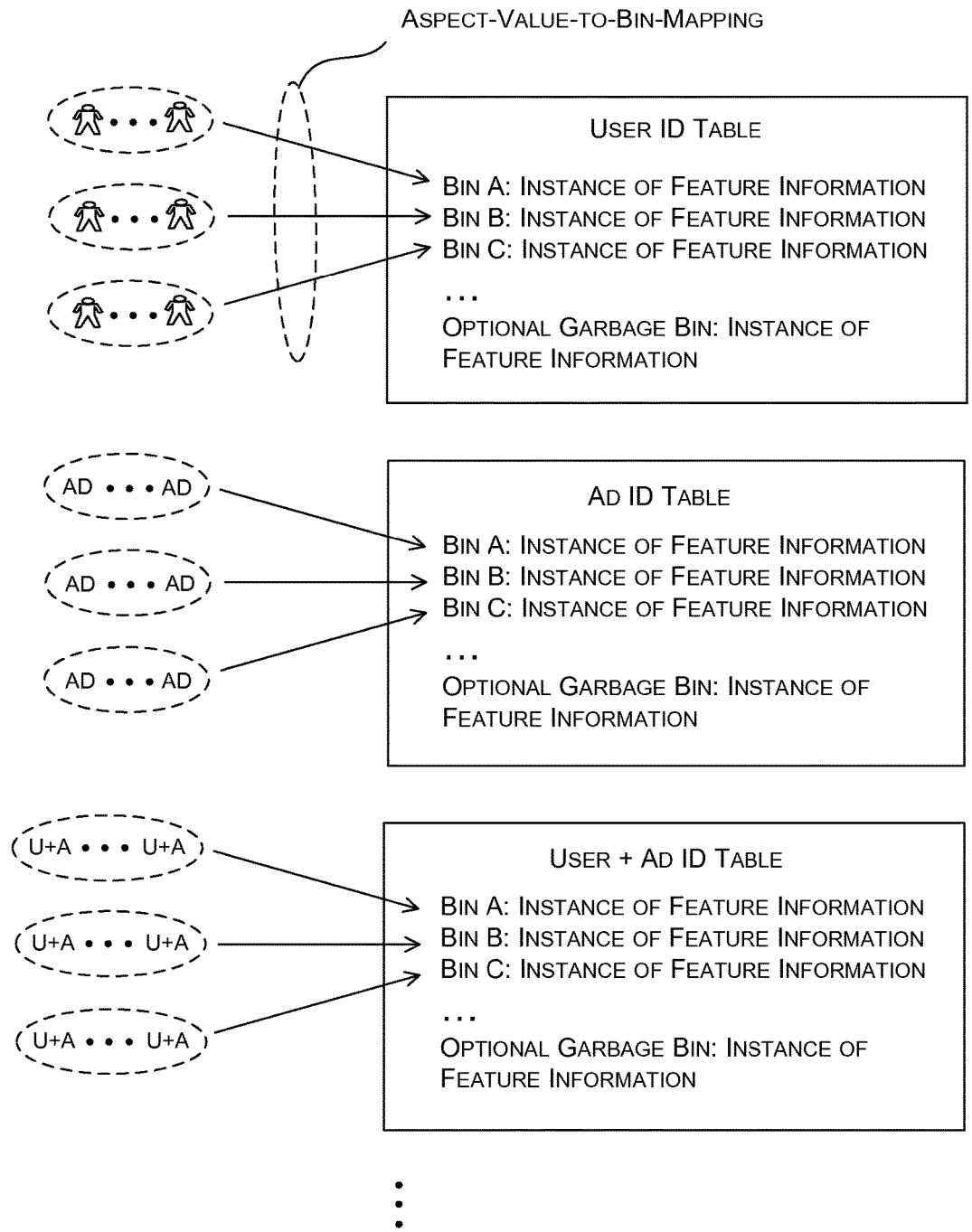
FIG. 3 shows illustrative tables produced by the training process of FIG. 1.

FIG. 2, for instance, shows a data store 202 that stores one kind of master dataset that is made up of a plurality of training examples. Each training example describes an event, such as the user's decision to click on an object or not click on an object, such as an ad or an item within search results. Each training example is made up of one or more aspect values and a label. The aspect values describe different characteristics of the event. The label identifies any type of outcome or evaluation of the event. For instance, the label may identify whether the user does in fact click on the object, or decline to click on the object.

More specifically, as outlined in concept-taxonomy tree of FIG. 2, an event is associated with various variables, referred to herein as aspects. For example, user-related aspects pertain to a user who interacts with a system. For instance, one such user-related aspect may identify the user, another aspect may identify the user's location, another aspect may identify a user agent string associated with the user's browser, and so on. Content-related aspects pertain to content provided to the user, or, at prediction time, content that is being considered for presentation to the user. For instance, one such content-related aspect may identify an ad or search result item, another aspect may identify an advertiser, another aspect may identify a category of an ad, and so on. Context-related aspects pertain to a context in which the content is delivered (or to be delivered) to the user. For instance, one such context-related aspect may describe a query submitted by a user, another such aspect may describe a position of a content item with relation to other content items, and so on. These aspects are cited by way of example, not limitation.

Each aspect variable may take on a set of different aspect values. An aspect value, in turn, may correspond, in some cases, to a single attribute value. In other cases, an aspect value may correspond to a conjunction of two or more attribute values. For example, consider the aspect associated with user identity (e.g., user ID stored in a browser cookie). Each aspect value in this case maps to a single attribute value, namely, a particular user identity. Next consider the aspect associated with a combination of user identity and ad identity. Each aspect value in this case maps to a combination of a particular user identity and a particular ad identity. In other words, the aspect value in this latter case has two components, a first component associated with the user identity and a second component associated with the ad identity. As can be appreciated by just this simplified example, the domain of possible aspect values is very large, potentially on the order of millions, or even greater.

Returning to FIG. 1, a partitioning process 112 produces a plurality of partitions (also referred to as bins) for each aspect under consideration. Each partition is associated with a set of aspect values. For example, assume that the partitioning process 112 produces partitions associated with the aspect of user identity. A first partition may be associated with a first subset of user identity values, a second partition may be associated with a second subset of user identity values, and so on. The partitioning process 112 performs a similar partitioning process for other aspects, including both aspects associated with single attributes and aspects associated with combinations of attributes (such as user identity and ad identity).

Next, in a filtering and aggregation process 114, the training system identifies plural subsets of data, selected from the master dataset 110, for the different respective partitions. The training system then forms plural instances of statistical information based on the respective subsets of data for the respective partitions. Consider, for example, the case in which a first partition is associated with a particular set of user identities. The training system can extract that subset of training examples in the master dataset 110 that pertain to the set of user identities. This constitutes the subset of data for this partition. The training system can then form statistical information based on the information provided in that subset of data.

More specifically, different implementations may generate different kinds of statistical measures. In one case, the training system can form a count of the label values associated with the training examples. Consider the above example in which a partition corresponds to a group of user identities. The training system can form a first count based on the number of times that the users in the identified group performed a click, and a second count based on the number of times that the users in the identified group declined to click when given a chance to do so. The statistical information can also include various averages, ratios, etc. The statistical information can also include information which represents the output of a prediction module. For example, in addition to the user's actual decision to click or not click on an object, the prediction module may have generated a prediction as to whether the user would click or not click on the object. The statistical information can provide one or more statistical measures that are based on these predicted values.

More generally stated, the term "statistical" is used broadly herein to refer to any information that can be derived from one or more training examples and/or one or more predictions. The different instances of statistical information collectively constitute feature information. Individual statistical measures within the feature information constitute features. For example, a count of the number of click events within a particular partition constitutes one feature in the feature information. The statistical information may generally be regarded as label-conditioned insofar as it reflects a distribution of labels, such as a distribution of click events or non-click events.

The training system can formulate its results using a number of tables or other types of lookup data structures. Advancing momentarily to FIG. 3, this figure illustrates three such tables. Each table is associated with a particular aspect, where that aspect may pertain to a single attribute (such as user identity) or a combination of attributes (such as user identity and ad identity). Each table includes plural entries associated with different partitions. Each partition, in turn, provides statistical information generated for that partition, which may comprise one or more statistical measures that correspond to features.

For example, consider the top-most table associated with user identity. That table may include a first partition (i.e., bin A) that provides statistical information for a first group of user identities, a second partition (i.e., bin B) that provides statistical information for a second group of user identities, and so on. Any table may optionally also include a catch-all "garbage" partition. That is, for the user identity table, the garbage partition may store statistical information that pertains to all user identities that do not fall into any other partitions, such as bins A, B, C, etc.

In another implementation, the training system may map some aspect values to two or more partitions within a table. For example, the training system may provide a hierarchy (e.g., a tree) of partitions, where a child partition may be considered as subsumed within a more general partition. In this case, the training system may map an aspect value to both a specific partition and its more encompassing parent partition. If the aspect value does not belong to any specific partition, the training system may map it to just the general catch-all partition. The features associated with an aspect value that belongs to two or more partitions may reflect any kind of combination of the statistical information associated with those partitions. Still other strategies are possible for structuring a set of partitions, and for mapping aspect values to those partitions.

Returning to FIG. 1, in a model training process 116, the training system next produces the prediction model 106 based on a set of training examples, together with the feature information generated by the training system. For example, the training system can generate the feature information using a first set of training examples contained within the master dataset 110. The training system can then produce the prediction model 106 using a hold-out set of training examples in the master dataset 110, together with the feature information.

In operation, the training system maps each training example in the hold-out dataset to one or more aspect values. The training system then determines feature information associated with the aspect values, e.g., using the one or more of the tables shown in FIG. 3. The training system then uses a training technique to generate the prediction model 106 based on the feature information and the labels associated with the training examples. Any machine learning process can be used to perform this task. In one case, the outcome of the model training process 116 is a set of weights, parameters, etc., which, in part, define the prediction model 106.

In the model-application phase 104, the prediction model 106 is used to configure a prediction module (not shown in FIG. 1); the prediction module, in turn, is deployed in any target system. For example, in a search-related context, the prediction module can be deployed as part of a search engine system. In an advertising-related context, the prediction module can be deployed as part of an ad server system, and so on.

In operation, the prediction module receives input information which describes an online event. For example, the input information may indicate that the user has accessed a page containing one or more slots for presenting ads. Or the input information may indicate that the user has submitted a particular query, and so on. The prediction module identifies the aspect values associated with the event, such as the identity of the user, the identity of a particular candidate ad that can be presented to the user, and so on. The prediction module then consults one or more of the tables shown in FIG. 3 to identify feature information associated with the identified aspect values. The prediction module then generates a prediction based on the identified feature information.

As a general commentary on FIG. 1, note that the training system maps sets of aspect values to particular features, rather than mapping individual aspect values to particular features. By virtue of this approach, the training system may greatly reduce the dimensionality of the feature space, compared to the case in which each aspect value is assigned its own features. This allows the training system to perform the training phase 102 in an efficient manner. As a related benefit, an administrator may leverage the efficiency of the training system to construct a prediction model that is relatively complex (e.g., non-linear) in nature.

The training system may use different partitioning strategies to define partitions. In one approach, the training system can define partitions in a manner that satisfies an objective relating to loss of predictive accuracy. For example, the training system can produce partitions in a manner which minimizes the loss of predictive accuracy, or at least ensures that the loss of predictive accuracy is below a prescribed threshold. Predictive accuracy refers to an extent to which the statistical information accurately represents the labels associated with individual training examples which contribute to the statistical information.

Figure 4:
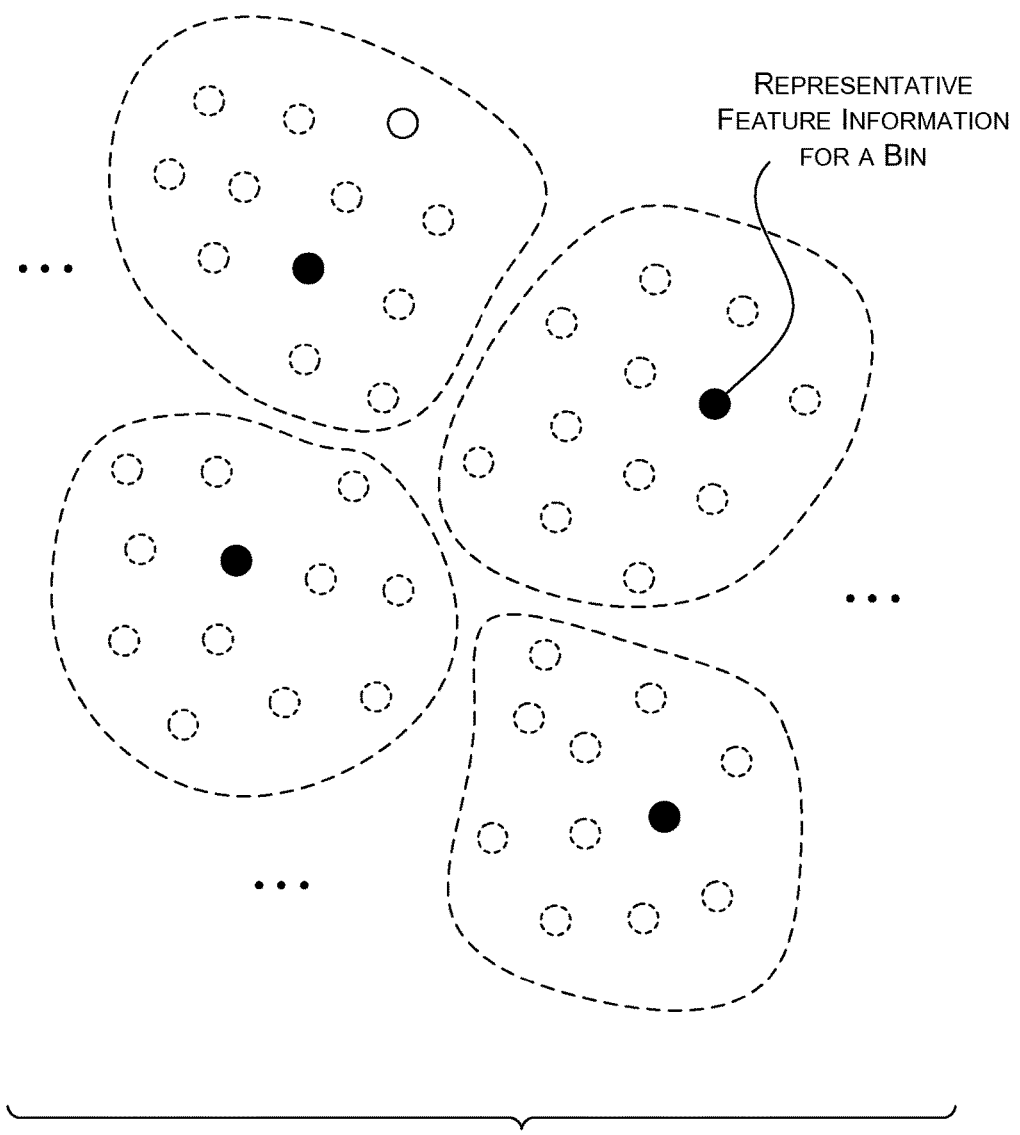
FIG. 4 is a high-level conceptual depiction of one partitioning strategy that may be used to produce partitions, in accordance with the principles set forth in FIG. 1.

FIG. 4 shows a high-level conceptual depiction of the above-described partitioning strategy. In this example, the training system produces clusters of aspect values, where the aspect values in each cluster exhibit similar label-conditioned statistical profiles. For example, the training system can identify the click-through rates associated with different individual user IDs. The training system can then form clusters of user IDs that have similar click-through rates. Further, the training system uses a single instance of statistical information to represent all of the members of the cluster. FIG. 4 represents that single instance as a black dot. Note that this "black dot instance" may or may not correspond to an actual member of its cluster. The training system minimizes the loss of predictive accuracy by performing clustering in such a manner that the instances of statistical information accurately characterize the members in the respective clusters, while minimizing, overall, the loss of descriptive information pertaining to specific members of the clusters.

In other implementations, the training system can use other partitioning strategies to produce the partitions. In one alternative technique, the training system can group aspect values based on a frequency measure. For example, the training system can assess the frequency at which each aspect value occurs within the master dataset 110. The training system can then group together aspect values that have similar frequency values.

In another case, the training system can group aspect values using a hashing technique. For example, the training system can associate different partitions with different hash buckets. The training system can then apply a hashing function to route a particular aspect value to at least one of the hash buckets.

In another case, the training system can group aspect values using a truncation strategy. For example, the training system can use the one or more bytes of an IP address to route an IP-related aspect value to one of a plurality of partitions. (Note that this operation may be considered as a particular kind of hashing.)

In another case, the training system can group aspect values on the basis of shared aspect values. For example, the training system can ensure that all entries in a particular partition have at least one common aspect value (such as a particular user ID).

The training system may use still other types of partitioning strategies to define the partitions. The above examples are cited by way of illustration, not limitation.

B. Illustrative Functionality for Implementing the Approach

Figure 5:
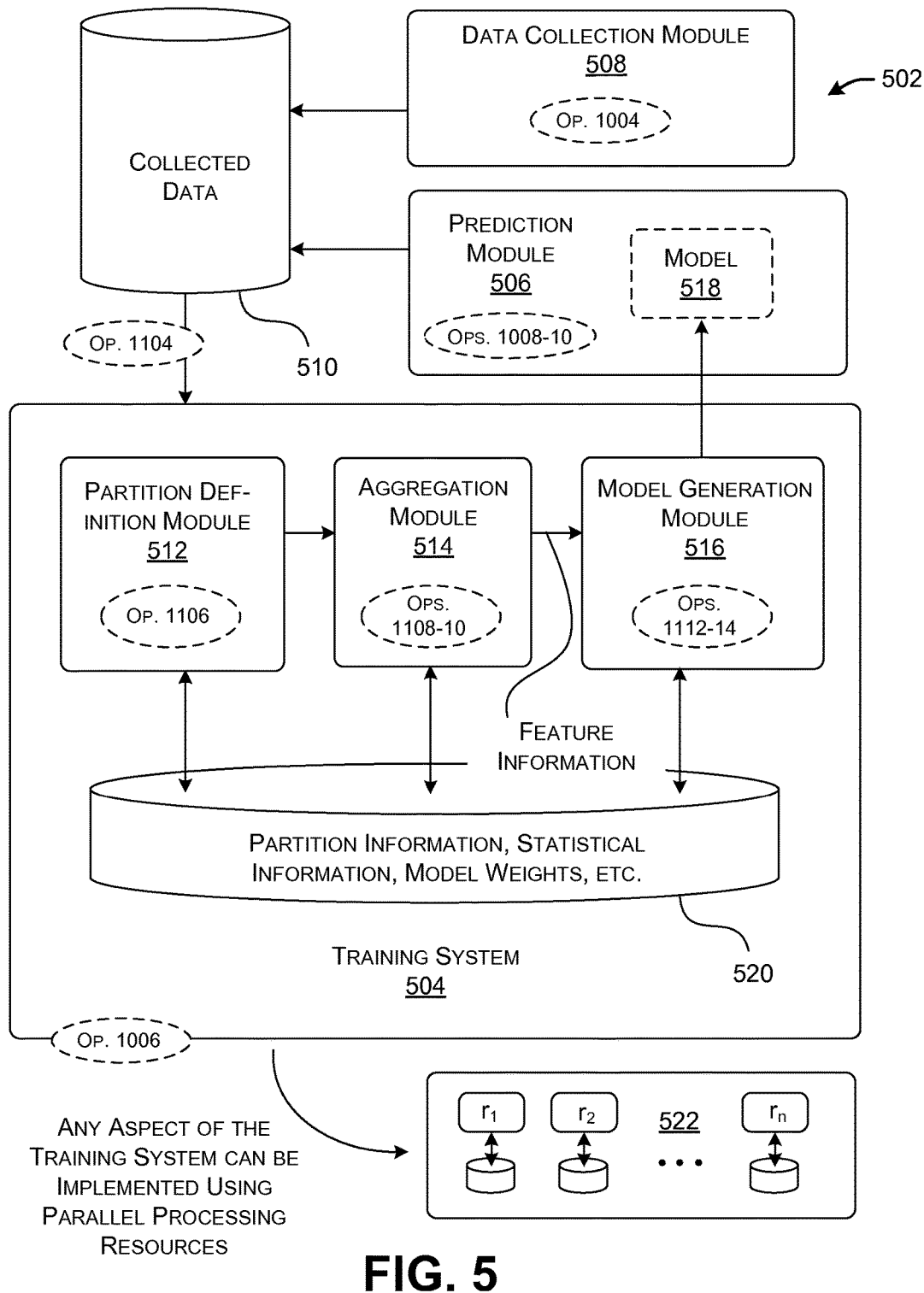
FIG. 5 shows one environment for practicing the approach of FIG. 1. The environment includes a training system and a prediction module.

FIG. 5 shows one environment 502 for implementing the approach of FIG. 1. The environment 502 includes a training system 504 for performing the training phase 102 of FIG. 1, and a prediction module 506 for performing the model-application phase 104 of FIG. 1.

The environment 502 also includes a data collection module 508 for providing collected data, and storing it in a data store 510. The data collection module 508 may represent functionality that is integrated with any other system functionality; in that case, the data collection module 508 performs operations which complement the services provided by the other system functionality. For example, in the context of a search engine system, the data collection module 508 can create a log that reflects user queries, click actions, non-click actions, IP addresses, locations, and so on. If authorized, the data collection module 508 can also store demographic information regarding the users who submit queries, and correlate that information with the actions taken by the users. Such demographic information can be supplied by the users and/or obtained from other sources. The data collection module 508 can also store information regarding content items that may be delivered to the users. Those content items may correspond to documents, web pages, ads, etc.

FIG. 5 also indicates that the environment 502 can store information regarding predictions made by the prediction module 506. For example, the prediction module 506 may provide a prediction that a particular user is likely to click on a particular ad. In response, an ad serving system may present that ad to the user. The user will either ignore the ad or click on the ad. The environment 502 will store both the user's actual action with respect to the ad and the prediction module's prediction as to the user's probable action.

As a result of the above data collection process, the data store 510 stores the master dataset 110 described in Section A. In formal terms, the master dataset 110 may represent a space $(X, Y)$, where X refers to a finite set of aspect values associated with the training examples, and Y refers to a binary set of values [0, 1] associated with the labels of the training examples. The symbol $x_i$ refers to an individual aspect value within the space X, and the symbol $y_i$ refers to an individual label value.

The training system 504 may include (or be conceptualized as including) different modules that perform different functions. A partition definition module 512 defines a number of partitions to be used to form instances of the statistical information. In one case, the partition definition module 512 selects a fixed number of partitions, m. In other cases, the partition definition module 512 may define the number of partitions in a dynamic manner based on one or more factors.

The partition definition module 512 then defines a manner in which aspect values are to be mapped to different respective partitions. As stated in Section A, in one approach, the partition definition module 512 specifies the mapping between aspect values and partitions in a manner which minimizes the loss of predictive accuracy, or achieves some other objective that is specified in terms of loss of predictive accuracy.

In formal terms, the partition definition module 512 attempts to compress the space X associated with the individual aspect values into a smaller space T, while capturing as much information about Y as possible. Assume here that the space T is indexed by M bits and thus includes m partitions, e.g., m=|T|=$2^M$. A hard partitioning function T=T(x) defines the manner in which the space T is broken up into different partitions. The symbol t refers to an individual partition within the space T.

To derive the function T(x), first consider that the amount of information about Y in T may be expressed as:

$$I(Y;T) = E_{t,y}\ln\frac{p(y|t)}{p(y)}$$

$$= \sum_t p(t)\left(\sum_{y\in\{0,1\}} p(y|t)\ln\frac{p(y|t)}{p(y)}\right)$$

$$= \sum_t p(t)\left(\sum_{y\in\{0,1\}} \frac{\sum_{x:T(x)=t} p(x)p(y|x)}{p(t)}\ln\frac{p(y|t)}{p(y)}\right)$$

$$= \sum_x p(x)\left(\sum_{y\in\{0,1\}} p(y|x)\ln\frac{p(y|T(x))}{p(y)}\right)$$

$$= \sum_x p(x)\left(\sum_{y\in\{0,1\}} p(y|x)\left(\ln\frac{p(y|x)}{p(y)} - \ln\frac{p(y|x)}{p(y|T(x))}\right)\right)$$

$$= E_{x,y}\ln\frac{p(y|x)}{p(y)} - \sum_x p(x)\sum_{y\in\{0,1\}} p(y|x)\ln\frac{p(y|x)}{p(y|T(x))}$$

$$= I(X;Y) - \sum_x p(x)D_{KL}(p(y|x)\|p(y|T(x))).$$

Stated in general terms, $D_{KL}(P\|Q)$ refers to the Kullback-Leibler divergence measure between two Bernoulli distributions with parameters P and Q. The symbol E is an expectation value operator. p(a) refers to the probability of some event having a value a, whereas p(a|b) refers to the probability of some event having a value a given value b.

The above derivation indicates that the amount of information loss for the partition function T(x) is equal to $\Sigma_x p(x)D_{KL}(p(y|x)\|p(y|T(x)))$. The amount of mutual information between Y and X is constant. Hence, to maximize the mutual information between Y and T, the partition definition module 512 can minimize the amount of information loss for the partition function T(x). That minimization task may be expressed as:

$$T^* = \underset{T}{\mathrm{argmin}}\sum_x p(x)D_{KL}(p(y|x)\|p(y|T(x))).$$

When partitions for different values of x can be chosen independently, the criterion for choosing the most appropriate partition for the aspect value x can be expressed as:

$$T^*(x) = \underset{t}{\mathrm{argmin}} D_{KL}(p(y|x)\|p(y|t)).$$

To provide a concrete example of one application of the above equation, consider the illustrative case in which a click-through rate $CTR_x$ is associated with each aspect value x. The partition definition module 512 can apply the above equation by sorting all values x by their $CTR_x$. The partition definition module 512 can then form clusters of aspect values which have similar click-through rates, where the distance between any two click-through rates is measured using the KL divergence. This establishes an initial group of partitions and a mapping between aspect values and partitions.

After the prediction model is deployed, assume that a new aspect value x is encountered that was not represented by the initial set of training examples. The partition definition module 512 can use the above equation to map the new aspect value into the partition that satisfies the above-stated argmin equation, as in $T^*(x)=\mathrm{argmin}_t D_{KL}(CTR_x\|CTR_t)$, where $CTR_t$ refers to the click-through rate associated with an entire candidate partition t. As will be explained below, the partition definition module 512 can also periodically re-compute the entire mapping function T(x) to take account of new data that is collected after deployment of the prediction model.

The above equations were predicated on the assumption that the prediction module 506 only takes into account features that are derived from the aspect values, associated with aspect space X. In another case, the prediction module 506 can also take into account some features of events other than X. Let the random variable Z refer to all such other features. In some cases, Z can represent just one feature, such as the gender of a user, etc. In other cases, Z may represent some aggregate of all other features.

One way to summarize the contribution of these other features is by setting Z equal to the output of the prediction module 506; that output, in turn, takes the other features into account, as expressed by Z=$\hat{p}$(y=1|other features). It is assumed here that the domain Z is discrete and has limited cardinality. In those cases in which the output of the prediction module 506 is continuous, the partition definition module 512 can discretize it in an appropriate manner.

The goal remains to compress the space X into a smaller space T with m partitions, while capturing as much of the information in Y as possible. To now take into account the contribution of the variable Z, the amount of information about Y in T can be expressed in conditional fashion as follows:

$$I(Y|T;Z) = E_{t,y,z}\ln\frac{p(y|t,z)}{p(y|z)}$$

$$= \sum_{t,z} p(t,z)\left(\sum_{y\in\{0,1\}} p(y|t,z)\ln\frac{p(y|t,z)}{p(y|z)}\right)$$

$$= I(X;Y|Z) -$$

$$\sum_{x,z} p(x,z)D_{KL}(p(y|x,z)\|p(y|T(x),z)).$$

Considering that the mutual information expressed by I(X; Y|Z) is constant, the partition definition module 512 can express the optimal partitioning function as follows:

$$T^* = \underset{T}{\mathrm{argmin}}\sum_{x,z} p(x,z)D_{KL}(p(y|x,z)\|p(y|(T(x),z)).$$

When partitions for different values of x can be chosen independently, the criterion for choosing the most appropriate partition for the aspect value x can be expressed as:

$$T^*(x) = \underset{t}{\operatorname{argmin}} \sum_z p(z \mid x) D_{KL}(p(y \mid x, z) \| p(y \mid t, z)).$$

In other cases, the partition definition module 512 can use other partitioning strategies to define the number of partitions, and to define the mapping of aspect values to particular partitions. For example, as described in Section A, the partition definition module 512 can alternatively use a frequency measure to map aspect values to partitions, e.g., by grouping aspect values having similar frequency measures. In another case, the partition definition module 512 can use a hashing or truncation strategy to map aspect values to partitions. In another case, the partition definition module 512 can attempt to map aspect values to partitions such that at least one partition includes a common aspect value or values. These options are cited by way of example, not limitation. These alternative techniques do not necessarily minimize loss of predictive accuracy in the manner described above.

As a result of its processing, the partition definition module 512 produces a mapping function M which maps different aspect values to indices k associated with respective partitions, e.g., as in $M(X) \to k_1, k_2, \ldots, k_n$. For example, in one implementation, the mapping function can map each aspect value into a single index value; that single index value, in turn, identifies a partition within an appropriate table. In another implementation, the mapping function can map each aspect value into two or more partitions associated with a table. This latter option may be appropriate in the case in which the partitions are structured in a hierarchical manner.

An aggregation module 514 identifies, for each partition, a subset of data within the master dataset 110; that subset matches the mapping criterion specified by the partition definition module 512. The aggregation module 514 then forms statistical information for the partition based on the subset of data. As described in Section A, the aggregation module 514 can form different statistical values. For example, the aggregation module 514 can form a count ($N_x^+$) of the number of click events for the aspect value x in question, as well as a count ($N_x^-$) for the number of non-click events. The aggregation module 514 can also form various other statistical measures, such as normalized counts, averages, standard deviations, click-through rates, other ratios (e.g., $\ln(N_x^+/N_x^-)$), etc. The aggregation module 514 can also represent a statistical distribution as a mixture model, such as a Gaussian mixture model. The aggregation module 514 can then provide features that represent the parameters of the components of that mixture model. The aggregation module 514 can also form statistical measures based on predictions made by the prediction module 506, instead of actual actions taken by the user.

After the initial training, the aggregation module 514 can update the instances of statistical information as new data is collected. Formally stated, at a particular time, each partition t has a label-conditioned probability $q_t = p(y=1 \mid t)$. The aggregation module 514 can update the partitions in a two-phase approach. During a first phase, the aggregation module 514 can associate aspect values with particular partitions. During a second phase, the aggregation module 514 can update the values $q_t$ for the partitions according to $q_t = p(y=1 \mid t) = \sum_{x: T(x)=t} p(x) p(=1 \mid x)$. This algorithm has the effect of agglomeratively clustering aspect values based on their probability distributions $p(y \mid x)$.

More specifically, the aggregation module 514 can perform its aggregation operation based on the following expression: $T(k) \to A(V(M(x_i), y_i, f(x_i), [\text{extraData}]))$. The function $V(\ldots)$ represents the mapping of an aspect value to a particular statistical measure within a particular partition, where the function $M(x_i)$ identifies the index of the partition. The expression indicates that the statistical measure can be updated based on any of $y_i$, $f(x_i)$, and extraData. The symbol $y_i$ represents the label associated with the training example, e.g., whether the user has clicked or failed to click on a designated object. The symbol $f(x_i)$ refers to any arbitrary function based on $x_i$, e.g., one that that modifies the contribution of the corresponding $y_i$. For example, $f(x_i)$ may refer to a weight that discounts the contribution of $y_i$ based on a position of an item within search results (where $y_i$ reflects whether the user clicked on this item or failed to click on this item). The symbol extraData refers to supplemental information that also may influence the aggregation. For example, the extraData may correspond to a prediction made by the prediction module 506. The outer-enclosing function $A(\ldots)$ designates the aggregation operation performed by the aggregation module 514.

Consider, for example, the case in which the aggregation module 514 uses the above expression to update a table associated with a user ID aspect. The aggregation module 514 may use the above expression to update a first statistical measure associated with click events, and a second statistical measure associated with non-click events:

$$A(V(M(x_i), y_i, f(x_i))) = \left[ \sum_{(x_i, y_i): y_i = 1} f(x_i), \sum_{(x_i, y_i): y_i = 0} f(x_i) \right].$$

That is, the first term of this expression generates a count for the click events, while the second term in this expression generates a count for the non-click events. The function $f(x_i)$ discounts each contribution to a count by the position of the object that the user has clicked on (or not clicked on).

A model generation module 516 produces a prediction model 518 based on the feature information provided by the aggregation module 514, together with a set of hold-out training examples. The model generation module 516 can use any machine learning technique to perform this task.

The prediction module 506 then uses the prediction model 518 to make predictions after it is deployed. The prediction module 506 can be implemented using any machine learning technology, such as an ensemble of decision trees, a neural network, a support vector machine, and so on. The training performed by the model generation module 516 can be tailored in an appropriate manner to whatever type of prediction module 506 is being used by the environment 502.

A data store 520 can store various information produced by the training system 504. That information can include the mapping function $T(x)$, provided by the partition definition module 512, which maps aspect values to partitions. The stored information can also include the feature information provided by the aggregation module 514. The stored information can also include whatever information defines the prediction model 518 produced by the model generation module 516. For example, in some implementations, the data store 520 stores various weights, parameters, etc. which define the prediction model 518.

Finally, FIG. 5 indicates that the environment 502 can use any parallel processing resources 522 to implement any aspect of the training system 504. For example, the environment 502 can use the parallel processing resources 522 to perform the operations of the aggregation module 514, which entail identifying data that maps to the partitions and then accumulating the mapped data into various statistical measures. In one implementation, for example, different processing resources can perform the functions of the aggregation module 514 for different respective partitions. Further, in some implementations, different processing resources can also be used to perform the functions of the aggregation module 514 for any individual partition, thereby further expediting the operations performed for this partition.

The parallel processing resources 522 can be implemented as plural processor modules and associated data stores. The processor modules can be implemented using CPU-driven (and/or GPU-driven) computing devices. Alternatively, or in addition, the processor modules can be implemented by hardwired logic components.

Figure 6:
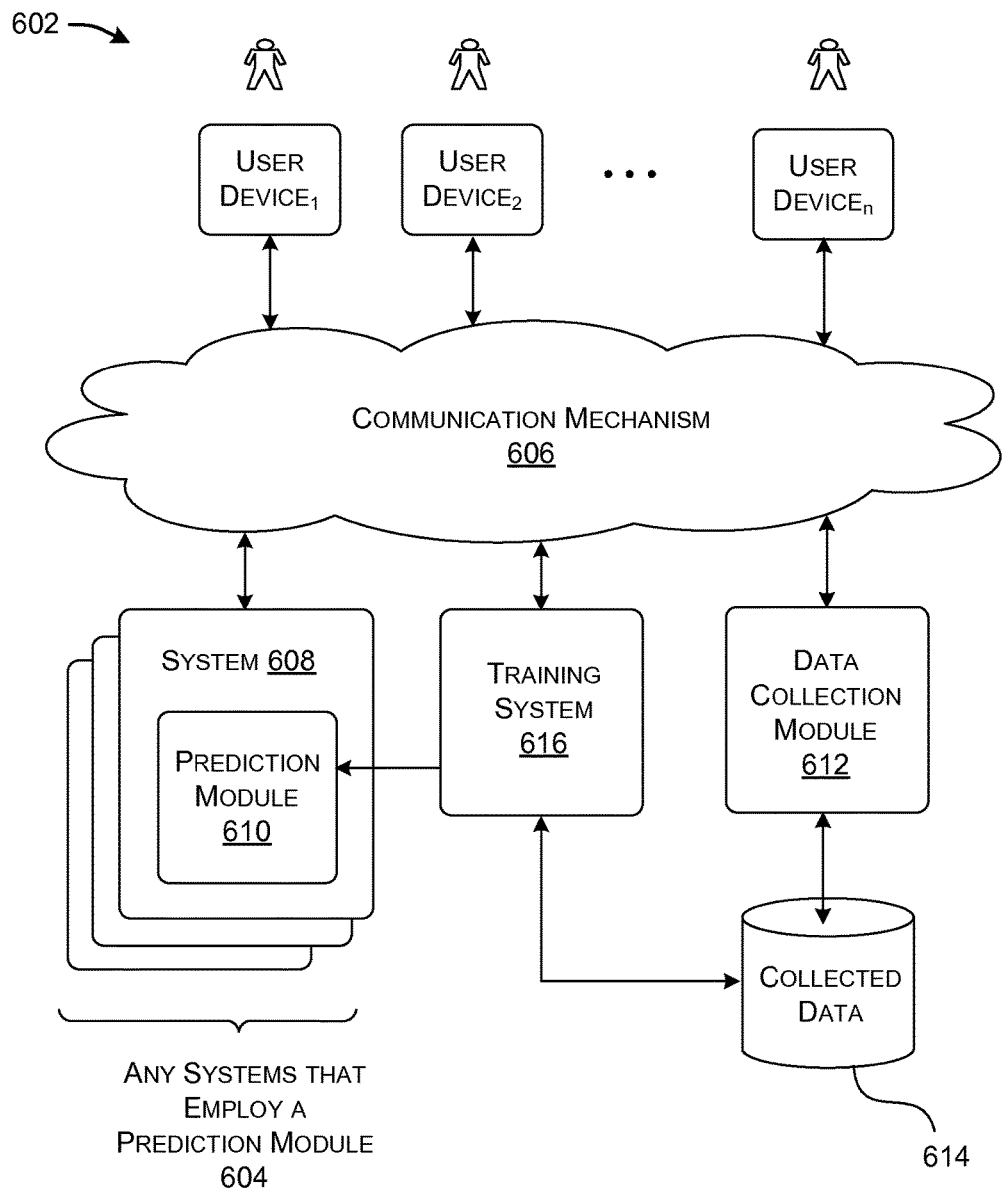
FIG. 6 shows a more specific environment for practicing the approach of FIG. 1, compared to the example of FIG. 5.

FIG. 6 shows a more specific environment 602 for practicing the approach of FIG. 1, compared to the example of FIG. 5. In this environment 602, users may interact with any types of user devices to communicate with an assortment of online systems 604 via a communication mechanism 606, such as a wide area network (e.g., the Internet). The systems 604 can provide any respective services to the users. For example, one system may provide a search engine service. Another system may provide an ad server service, and so on.

Each system may employ a prediction module that predicts user behavior in the context of the service that it offers. For example, a representative system 608 provides a prediction module 610. For instance, a search engine system may provide a prediction module to assess the likelihood that a user will click on a certain item within search results. The search engine system can perform various actions based on this prediction, such as by choosing the position of the item within the search results based on the prediction, e.g., to more prominently display an item that is likely to interest a particular user.

A data collection module 612, data store 614, and training system 616 may perform the same functions as the same-named components described with respect to FIG. 5. In the context of FIG. 6, any of the data collection module 612, the data store 614, and the training system 616 can be integrated into the system(s) which they serve, such as a search engine system. Alternatively, or in addition, some of these components can be implemented by computing equipment that is separated from the system(s) that they serve. For example, the training system 616 may be implemented as a component that provides training-related services to two or more systems, and is independent of those systems.

In terms of physical implementation, any user device can be implemented by any type of computing device, such as a personal computer, a computer workstation, a laptop computer, a tablet-type computer, a smartphone or other type of cellular telephone, a game console device, a set-top box device, and so on. Each of the systems 604, the data collection module 612, and the training system 616 can be implemented as one or more servers in association with one or more data stores. The functionality of any such component can be implemented at a single site, or can be distributed across multiple sites.

Figure 7:
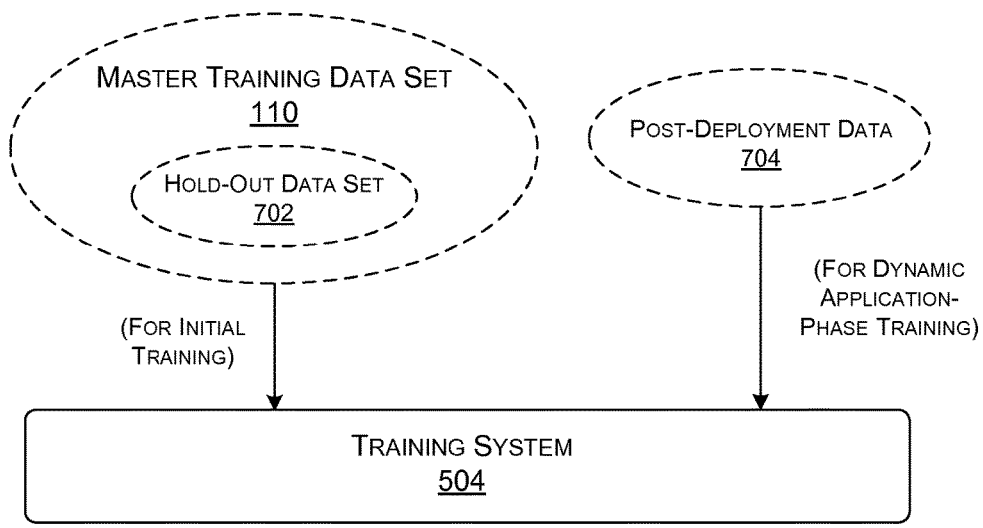
FIGS. 7 and 8 show illustrative aspects of a training process provided by the training system of FIG. 5.
Figure 8:
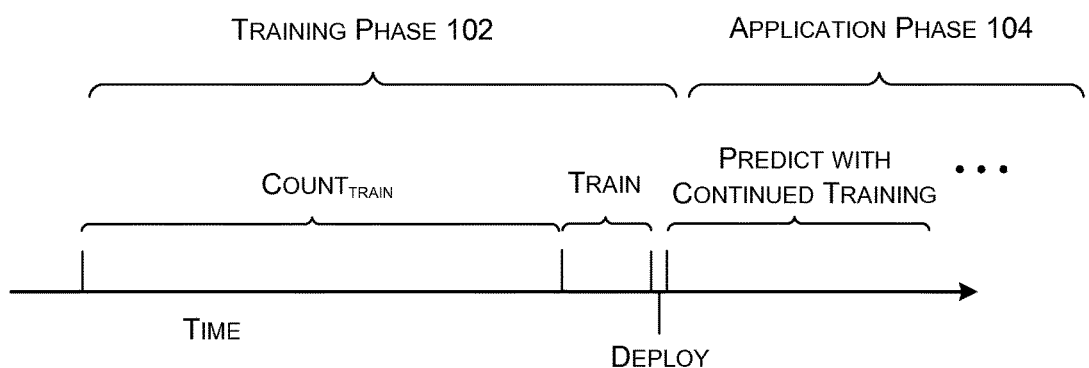

FIGS. 7 and 8 show illustrative aspects of a training process provided by the training system 504 of FIG. 5. With reference to FIG. 1, the training encompasses the initial training that is performed in the training phase 102 and the dynamic training that occurs during the model-application phase 104.

With reference to FIG. 7, the training system 504 can use a portion of the master dataset 110 to define the partitions and to generate the statistical information. The training system 504 can then use another portion of the master dataset 110, referred to as the hold-out dataset 702, to train the prediction model 518. Training in this case entails, for each training example in the hold-out dataset 702, identifying the aspect value(s) associated with this training example, and then identifying the feature information which is associated with the aspect value(s). This provides one exemplary association among aspect value(s), feature information, and a label. The model generation module 516 trains the prediction model 518 based on a collection of training instances produced in the above-described manner.

The training system 504 uses post-deployment data 704 that is collected following deployment of the prediction model 518 to update the prediction model 518. This further training can constitute updating the statistical information provided by the partitions in response to user click events (and non-click events) that occur following the deployment of the prediction model 518. For example, consider the case of an aspect value that was encountered in the initial training process; here, the training system 504 can route data associated with a new occurrence of this aspect value to the appropriate partition, and then update the statistics for this partition based on the new data. That is, the new data corresponds to information regarding the aspect value and the subsequently obtained label (e.g., click or non-click event). In another case, assume that the aspect value that is newly encountered has not been observed during the initial training phase 102. Here, the training system 504 uses the partition definition module 512 to determine the most appropriate partition to place the new aspect value. The training system 504 then updates the statistical information for that partition based on the data associated with the occurrence of the new aspect value.

In addition, the training system 504 can periodically reevaluate its entire strategy for mapping aspect values to different partitions. This provision is helpful to address situations in which the label-conditioned statistical information associated with an aspect value changes over time, e.g., based on changes in underlying user behavior and/or other factors.

FIG. 8 summarizes the above explanation of the training process in temporal terms. The initial training phase 102 includes a first training period ($Count_{train}$) in which the training system 504 defines the partition mapping strategy and generates instances of statistical information. The initial training phase 102 includes a second training period (Train) for training the prediction model 518 based on the features learned in the $Count_{train}$ period. After deployment, in the model-application phase 104, the training system 504 continues to update the prediction model 518 in the manner described above.

Figure 9:
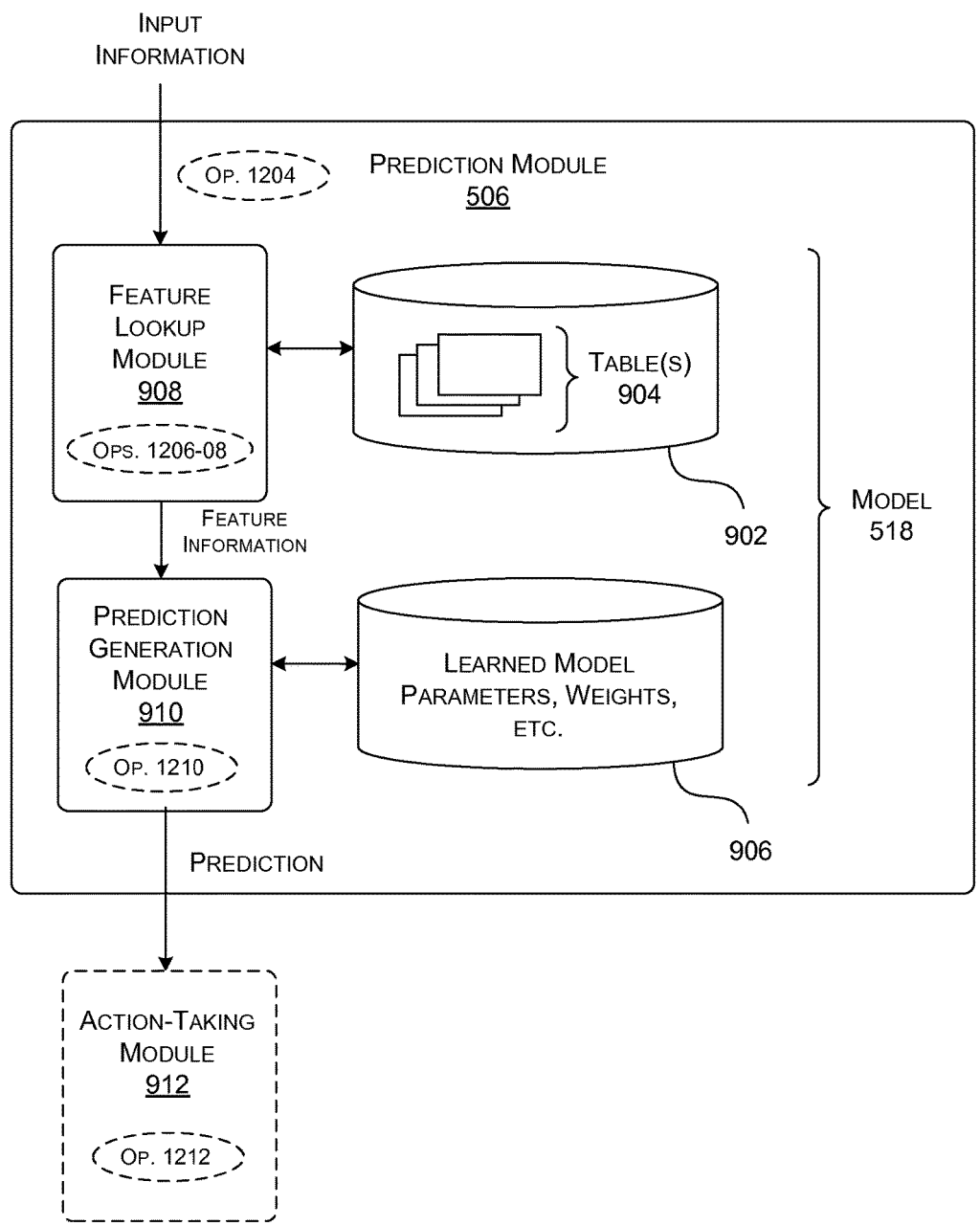
FIG. 9 shows one implementation of the prediction module of FIG. 5.

FIG. 9 shows one implementation of the prediction module 506 of FIG. 5. The prediction module 506 includes a data store 902 that stores one or more tables 904, such as the kind of tables shown in FIG. 3. Each such table specifies a set of partitions associated with an aspect. That aspect may correspond to a single attribute (such as a user ID) or a combination of attributes (such as user ID and ad ID). Each partition provides statistical information provided by the training system 504. That statistical information provides features for use in performing prediction. A second data store 906 may store whatever information (e.g., weights, parameters, etc.) that is generated by the model generation module 516. Collectively, the information provided in the data stores 902 and 906 constitutes the prediction model 518.

A feature lookup module 908 receives input information when it is appropriate to generate a prediction. For example, the feature lookup module 908 can receive input information when a user submits a search query to a search engine system; in this situation, the search engine system will call on the prediction module 506 to determine the probability that a user will click on each of a plurality of candidate search result items.

In a first operation, the feature lookup module 908 can determine all aspect values associated with the event under consideration, e.g., corresponding, in the above example, to the case in which the user has submitted a query to a search engine system. The feature lookup module 908 then uses the aspect value(s) as keys to look up the corresponding features provided in the tables 904. This yields feature information.

A prediction generation module 910 then feeds the feature information as input into its prediction functionality, to yield an output prediction. In the case of the search engine system, the prediction may indicate, for each candidate search result item, the probability that the user will click on this item. Assume, for instance, that the prediction model 518 is implemented as a neural network. The prediction generation module 910 can feed the features in the feature information as an input vector into the input layer of the neural network. The neural network generates a value, ranging from 0 to 1, which indicates the probability associated with this input vector.

An action-taking module 912 takes any kind of action described above based on the prediction generated by the prediction generation module 910. The action-taking module 912 can be implemented by any component in the system in which the prediction module 506 is being employed, such as by a component within a search engine system or ad serving system.

C. Illustrative Processes

Figure 10:
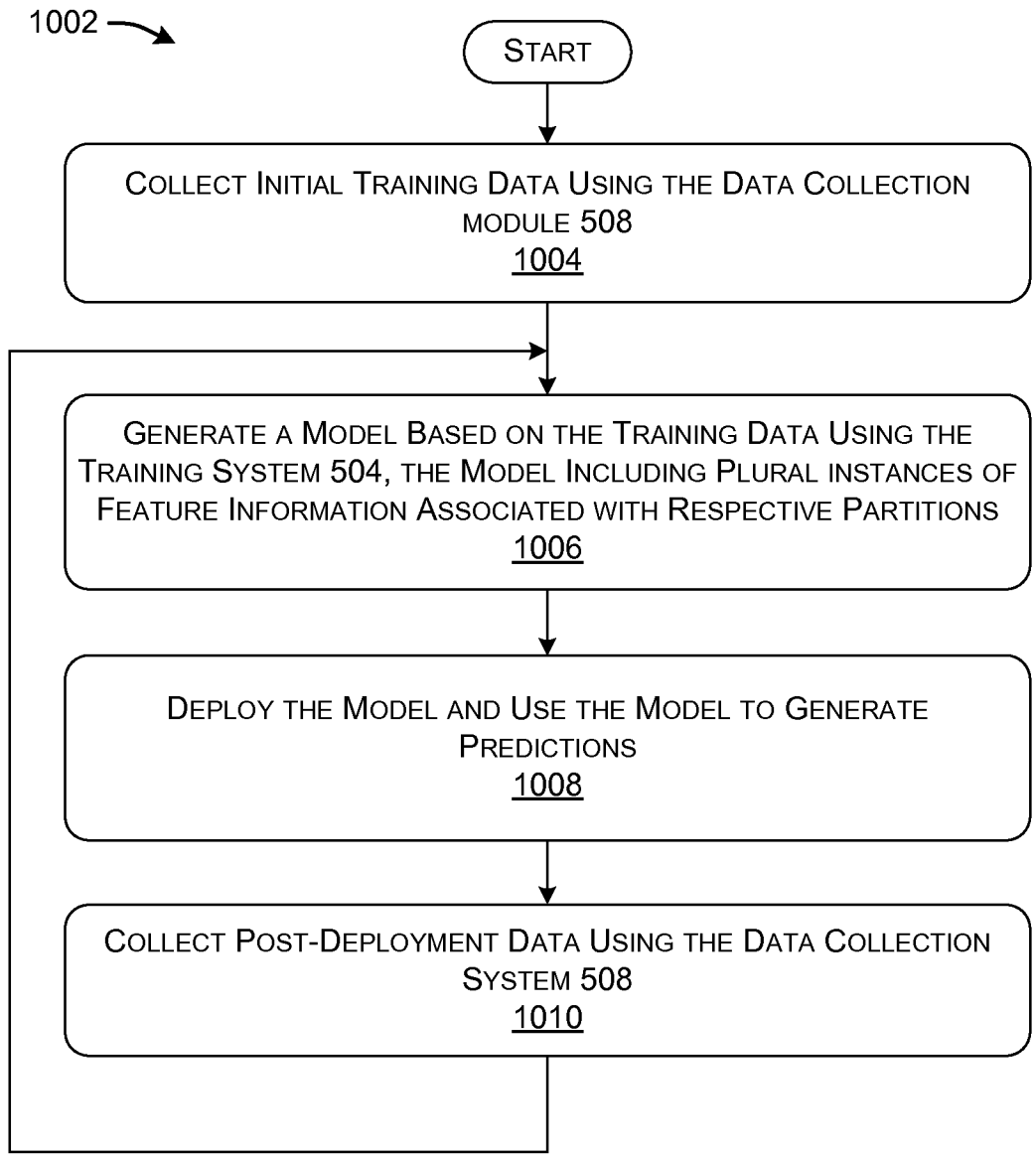
FIG. 10 is a flowchart that provides an overview of one manner of operation of the environment of FIG. 5.
Figure 11:
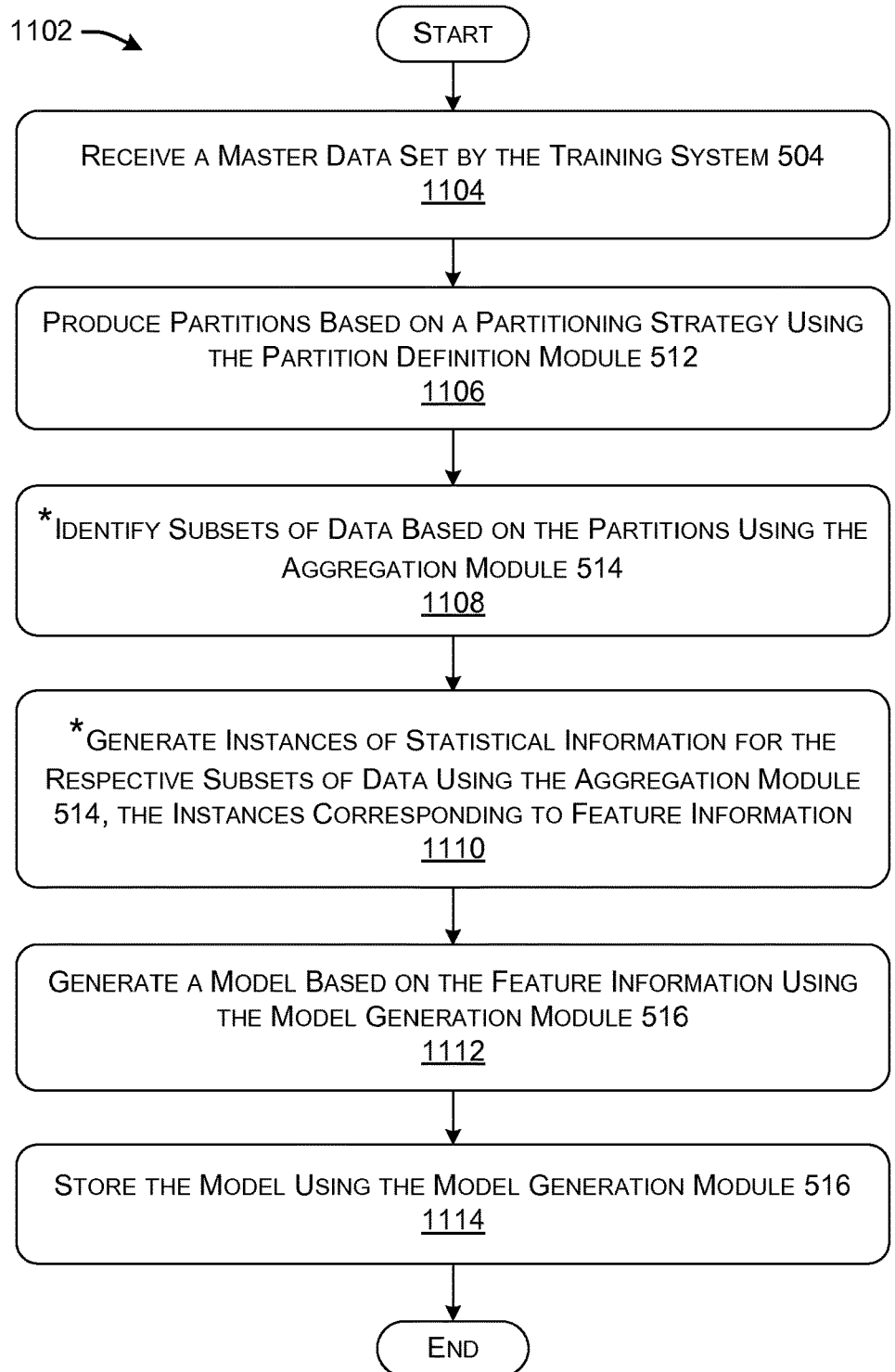
FIG. 11 is a flowchart that provides details regarding one manner of operation of the training system of FIG. 5.
Figure 12:
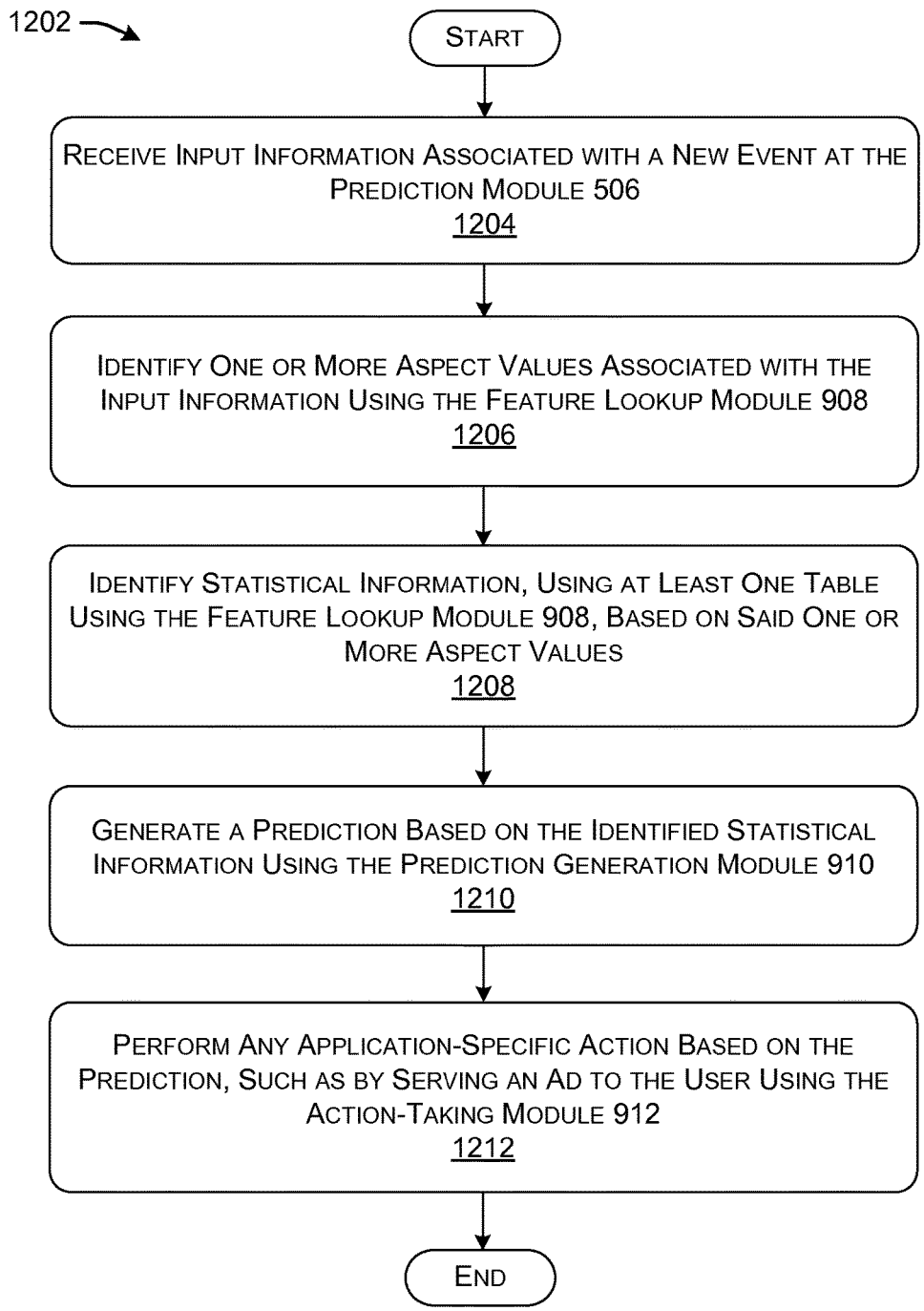
FIG. 12 is a flowchart that provides details regarding one manner of operation of the prediction module of FIG. 5.

FIGS. 10-12 show procedures that explain one manner of operation of the environment 502 of FIG. 1. Since the principles underlying the operation of the environment 502 have already been described in Section B, certain operations will be addressed in summary fashion in this section. FIGS. 5 and 9 are also annotated with reference numbers, placed within ovals, that correspond to the operations described below.

Starting with FIG. 10, this figure shows a procedure 1002 that represents an overview of one manner of operation of the environment 502 of FIG. 5. In block 1004, the data collection module 508 collects initial training data, to provide the master dataset 110, stored in the data store 510. In block 1006, the training system 504 generates a prediction model 518 based on the master dataset 110. The prediction model 518 provides plural instances of statistical information corresponding to respective partitions. In one implementation, the training system 504 can express the statistical information (which collectively constitutes feature information) in one or more tables, such as the kind of tables shown in FIG. 3. In block 1008, the environment 502 deploys the prediction model 518 and uses it to generate predictions. In block 1010, the data collection module 508 collects additional data based on post-deployment events. The feedback loop indicates that the training system 504 can use the post-deployment data to perform further training, yielding an updated prediction model 518.

FIG. 11 shows a procedure 1102 that provides additional details regarding one manner of operation of the training system 504 of FIG. 5. In block 1104, the training system 504 receives the master dataset 110. In block 1106, the partition definition module 512 produces partitions based on a partitioning strategy. In one example explained in Section B, the partition definition module 512 forms partitions in such a manner as to minimize the loss of predictive accuracy associated with the labels Y.

In block 1108, the aggregation module 514 identifies subsets of data based on the mapping function defined in block 1106. In block 1110, the aggregation module 514 504 generates instances of statistical information for the respective subsets of data identified in block 1108; this information collectively constitutes feature information. More specifically, blocks 1108 and 1110 are to be interpreted liberally herein. In a first implementation, the aggregation module 514 can generate a subset of data that includes plural data items, and then generate statistical information for this complete subset of data. In another case, the aggregation module 514 can identify a single item of data and then update the statistical information based on this single item, and then successively repeat this same two-phase procedure for all other data items in the subset of data. As also explained in Section B, the aggregation module 514 504 can perform blocks 1108 and 1110 using any parallel processing resources 522 to expedite these operations.

In block 1112, the model generation module 516 generates a prediction model 518 based on the feature information computed in block 1110, with respect to the training examples in the hold-out dataset 702. In block 1114, the model generation module 516 can store the prediction model 518 in the data store 520. The environment 502 can also automatically configure the prediction module 506 using the prediction model 518.

FIG. 12 shows a procedure 1202 that provides additional details regarding one manner of operation of the prediction module 506 of FIG. 5. In block 1204, the prediction module 506 receives input information associated with a new event, such as a new opportunity to make a prediction as to whether the user will click on a particular object in an online environment. In block 1206, the feature lookup module 908 identifies one or more aspect values associated with the input information. In block 1208, the feature lookup module 908 performs a lookup operation to determine the statistical information that is associated with the identified aspect value(s). That statistical information constitutes a set of features. In block 1210, the prediction generation module 910 generates a prediction based on the identified features. In block 1212, the action-taking module 912 may perform any application-specific action(s) based on the prediction made in block 1210. For example, the action-taking module 912 can make a decision regarding which ads to display to a user based on the conclusion made in block 1210. Or the action-taking module 912 can determine the position of items in a page based on the conclusion made in block 1210, and so on.

As a closing comment, the above examples described a case in which the labels are associated with click (or non-click events). But more broadly stated, a label can refer to any evaluation, conclusion, or outcome associated with a set of aspect values. Further, the environment 502 shown in FIG. 5 can be applied to other environments besides the type of service-driven online environment 602 of FIG. 6, including various offline environments. For example, the environment 502 can be used to process scientific data of any type, business-related data of any type, etc. For example, in a business-related environment, different partitions may be associated with different groupings of financial assets (e.g., stocks).

D. Representative Computing Functionality

FIG. 13 shows illustrative computing functionality 1300 that can be used to implement any aspect of the functions described above. For example, the type of computing functionality 1300 shown in FIG. 13 can be used to implement any component shown in FIGS. 5, 6, and 9. In one case, the computing functionality 1300 may correspond to any type of computing device that includes one or more processing devices. In all cases, the computing functionality 1300 represents one or more physical and tangible processing mechanisms.

The computing functionality 1300 can include volatile and non-volatile memory, such as RAM 1302 and ROM 1304, as well as one or more processing devices 1306 (e.g., one or more CPUs, and/or one or more GPUs, etc.). The computing functionality 1300 also optionally includes various media devices 1308, such as a hard disk module, an optical disk module, and so forth. The computing functionality 1300 can perform various operations identified above when the processing device(s) 1306 executes instructions that are maintained by memory (e.g., RAM 1302, ROM 1304, or elsewhere).

More generally, instructions and other information can be stored on any computer readable medium 1310, including, but not limited to, static memory storage devices, magnetic storage devices, optical storage devices, and so on. The term computer readable medium also encompasses plural storage devices. In many cases, the computer readable medium 1310 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1300 also includes an input/output module 1312 for receiving various inputs (via input devices 1314), and for providing various outputs (via output devices). Illustrative input devices include a keyboard device, a mouse input device, a touchscreen input device, a digitizing pad, one or more cameras, a voice recognition mechanism, any movement detection mechanisms (e.g., an accelerometer, gyroscope, etc.), and so on. One particular output mechanism may include a presentation device 1316 and an associated graphical user interface (GUI) 1318. The computing functionality 1300 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area network, a wide area network (e.g., the Internet), etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by one or more computing devices, for utilizing a reduced-dimensionality feature space prediction model to present user-selectable content in an online environment based on a prediction of a future user behavior within the online environment, by way of the prediction model that utilizes a feature vector as an input, the method comprising:

receiving a master dataset that includes a plurality of training examples, each training example in the plurality of training examples comprising:

an event that comprises a plurality of characteristics and a user's decision within a circumstance to click on an object or not click on the object, wherein the event is associated with aspect variables that describe the characteristics of the event, wherein the aspect variables associated with the event comprise user-related aspect variables, content-related aspect variables, and context-related aspect variables, and wherein each aspect variable is associated with a set of one or more possible aspect values, corresponding aspect values, and a label associated with the event, wherein the label identifies whether the user clicked on the object or declined to click on the object;

for a particular aspect of the event, producing plural partitions within the aspect values that correspond to the particular aspect, based on a partitioning strategy that includes grouping the aspect values into plural subsets of aspect values such that each partition is associated with a respective subset of aspect values, wherein the partitioning strategy comprises assessing a frequency at which each aspect value occurs within the master dataset and grouping together aspect values that have similar frequency of occurrence values;

for each of the respective partitions,
identifying plural subsets of data within the master dataset that pertain to the respective plural partitions, and
generating an instance of statistical information based on the respective corresponding subset of data, wherein the plural instances of statistical information correspond respectively to feature information that reflects a distribution of labels in the subsets of data, and wherein individual statistical measures within the feature information respectively constitute features which describe one or more events, wherein each feature corresponds to a plurality of aspect values, thereby providing a reduced dimensionality of a feature space that is utilized to train the prediction model;
generating the prediction model based on the feature information and a set of training examples, wherein the prediction model utilizes as input the feature vector comprising a set of the features that describe an event for which a prediction of the future user behavior is made;
storing the prediction model in a data store;
receiving input information associated with a new event comprising an online environment that displays user-selectable items to a user;
utilizing the prediction model to predict that the user will select a particular user-selectable item, based on features that correspond to the new event; and
based on having predicted that the user will select the particular user-selectable item, causing the particular user-selectable item to be presented to the user.

2. The method of claim 1, further comprising repeating said producing the plural partitions, said identifying the plural subsets of data, and said generating the plural instances of statistical information for one or more other aspects.

3. The method of claim 1, wherein the particular aspect is associated with a single attribute.

4. The method of claim 3, wherein the single attribute corresponds to one of:
user-related information pertaining to the user who interacts with a system;
content-related information pertaining to content provided to the user; and
context-related information pertaining to a context in which the content is delivered to the user.

5. The method of claim 1, wherein the particular aspect is associated with a combination of two or more attributes.

6. The method of claim 1, wherein the partitioning strategy involves grouping aspects values based on a loss of predictive accuracy measure.

7. The method of claim 1, wherein the partitioning strategy involves grouping aspect values in a manner that results in a minimum loss of predictive accuracy.

8. The method of claim 1, wherein the partitioning strategy involves one of:
grouping aspect values so that at least one partition includes aspect values that have a common component attribute value;
grouping aspect values using a clustering operation; and
grouping aspect values using a hashing operation.

9. The method of claim 1, wherein the prediction model generates a prediction that indicates a probability that a user will take a prescribed action with respect to a particular ad.

10. The method of claim 1, wherein the prediction model generates a prediction that indicates a probability that a user will take a prescribed action with respect to an item within search results.

11. The method of claim 1, further comprising:
deploying the prediction model in a prediction module, within a system;
using the prediction module to:
receive input information;
map the input information to associated feature information; and
generate a prediction based on the associated feature information.

12. The method of claim 11, further comprising:
collecting post-deployment data, each instance of the post-deployment data describing an event that occurs following deployment of the prediction model; and
using the post-deployment data, repeating one or more of: said producing the plural partitions, said identifying the plural subsets of data, and said generating the plural instances of statistical information.

13. A computer readable storage medium having embodied thereon computer-usable instructions which, when executed by one or more processing devices, perform a method for utilizing a reduced-dimensionality feature space prediction model to present user-selectable content in an online environment based on a prediction of a future user behavior within the online environment, the method comprising:
receiving a master dataset that provides plural training examples;
producing plural bins based on a partitioning strategy;
identifying plural subsets of data within the master dataset that pertain to the respective plural bins for a single aspect variable, wherein each subset of data corresponds to a respective bin, and wherein each subset of data comprises a respective set of aspect values for the aspect variable;
for each bin, generating a respective instance of statistical information based on the subset of data in the bin, wherein the respective instance of statistical information corresponds to the bin, wherein each instance of statistical information is utilized as a feature to train a prediction model, wherein each feature corresponds to a plurality of aspect values for the single aspect variable, thereby providing a reduced dimensionality of a feature vector that is utilized to train a prediction model;
training the prediction model, which predicts a future user behavior, based on the feature information and a set of training examples;
receiving input information that describes a new event, the new event comprising an online environment that displays user-selectable items to a user,
wherein the new event is associated with aspect variables that describe characteristics of the new event, and wherein each aspect variable is associated with a set of one or more possible aspect values;
identifying aspect values associated with the new event;
determining which of the instances of statistical information are associated with the identified aspect values, wherein the determined instances of statistical information constitute features that correspond to the new event;
utilizing the prediction model to predict that the user will select a particular user-selectable item, based on the features that correspond to the new event; and
based on the prediction that the user will select the particular user-selectable item, causing the particular user-selectable item to be presented to the user.

14. The computer readable storage medium of claim 13, the method further comprising expressing the feature information as a lookup data structure, each entry in the lookup data structure corresponding to a particular bin and a corresponding instance of statistical information.

15. The computer readable storage medium of claim 13, wherein said identifying and generating are implemented as a plurality of processing resources which operate in parallel.

16. The computer readable storage medium of claim 13, wherein the partitioning strategy involves producing bins that satisfy a prescribed predictive accuracy objective.

17. The computer readable storage medium of claim 16, wherein the bins satisfy the prescribed predictive accuracy objective when the bins produce a minimum loss of predictive accuracy.

18. A system for utilizing a reduced-dimensionality feature space prediction model to present user-selectable content in an online environment based on a prediction of a future user behavior within the online environment, comprising:
 a data store that provides at least one lookup data structure, each lookup data structure being associated with a particular aspect associated with events,
  wherein an event comprises a plurality of characteristics and a user's decision within a circumstance to click on an object or not click on the object,
  wherein the event is associated with aspect variables that describe the characteristics of the event,
  wherein the event is associated with a label that identifies whether the user clicked on the object or declined to click on the object,
  wherein each aspect variable is associated with instances of statistical information that represent respective partitions of aspect values associated with the aspect variable;
 and each lookup data structure identifies:
  plural partitions associated with the particular aspect; and
  plural instances of statistical information associated with the plural partitions, each instance of statistical information corresponding to a subset of aspect values for the particular aspect;
 a feature lookup module comprising one or more processors configured to:
  receive input information that describes a new event, wherein the new event comprises an opportunity to predict whether a current user will click on a particular object in an online environment;
  based on the input information that describes the new event, identify one or more aspect values associated with the new event; and
  identify, using said at least one lookup data structure, statistical information that is associated with the new event, based on a correspondence between said one or more aspect values and the statistical information, to produce identified statistical information, wherein instances of the identified statistical information correspond respectively to features that describe the new event, wherein each feature corresponds to a plurality of aspect values, thereby providing a reduced dimensionality of a feature space that is utilized to train the prediction model;
 a prediction generation module comprising one or more processors configured to generate a prediction, for the new event, of whether the user will click on the particular object in the online environment, based on an input feature vector comprising the features that describe the new event; and
 an action taking module comprising one or more processors configured to cause content to be presented to the online environment, wherein the content is determined and presented based on the prediction of whether the user will click on the particular object in the online environment.

19. The system of claim 18, wherein the prediction generation module is configured to generate a prediction that indicates a probability that a user will take a prescribed action with respect to a particular ad.

20. The system of claim 18, wherein the prediction generation module is configured to generate a prediction that indicates a probability that a user will take a prescribed action with respect to an item within search results.

* * * * *